Oct. 6, 1942.   G. L. JONES   2,297,893
RAIL WELDING
Filed Nov. 4, 1939   2 Sheets-Sheet 1
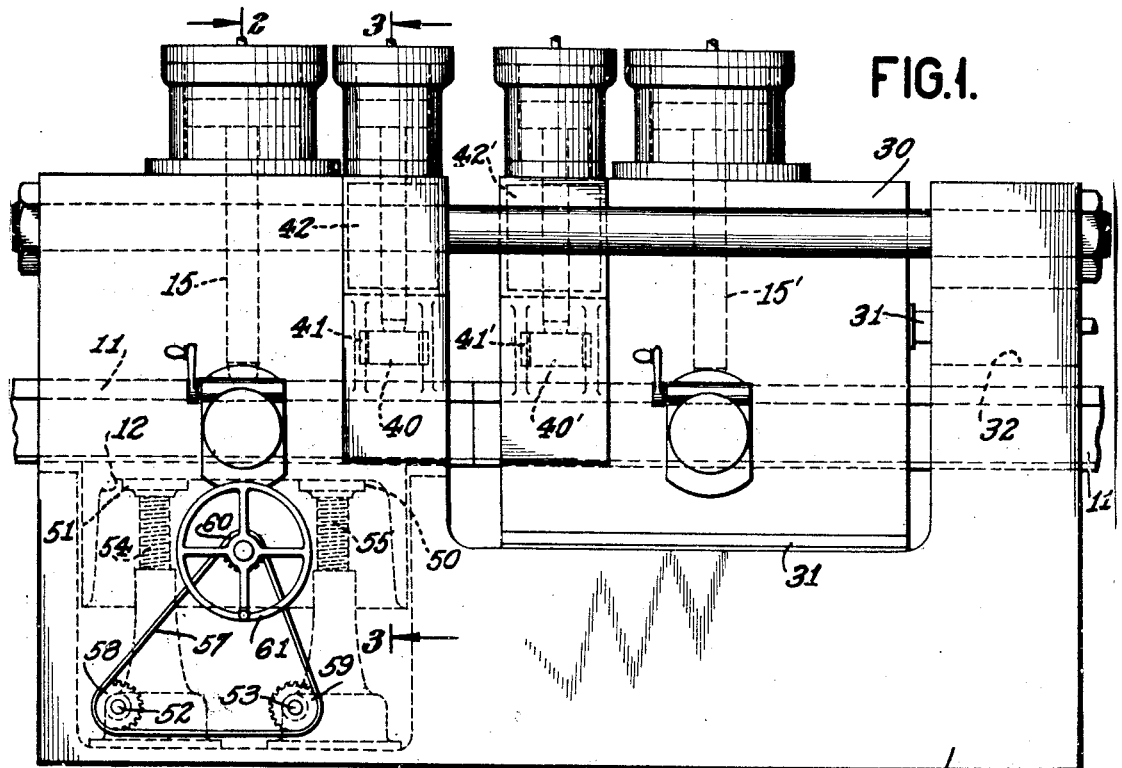
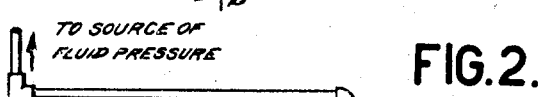
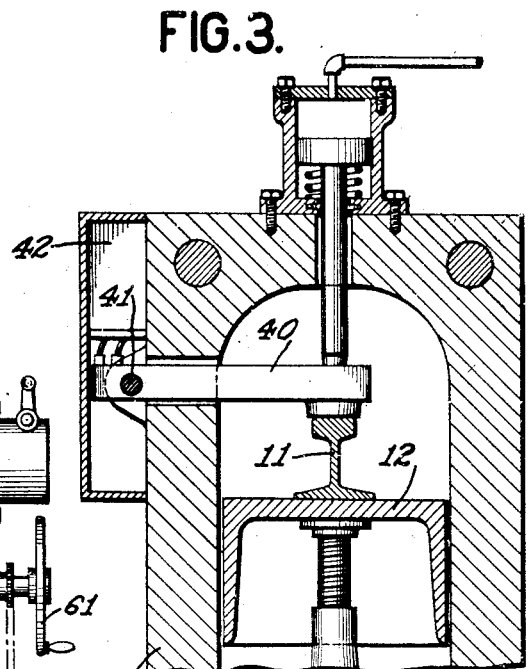
INVENTOR
GEORGE LESTER JONES
BY
Joseph H. Lipschutz
ATTORNEY Oct. 6, 1942.  G. L. JONES  2,297,893

RAIL WELDING

Filed Nov. 4, 1939  2 Sheets—Sheet 2

INVENTOR
GEORGE LESTER JONES
BY
Joseph H. Lipschutz
ATTORNEY

Patented Oct. 6, 1942

2,297,893

UNITED STATES PATENT OFFICE 2,297,893

RAIL WELDING

George Lester Jones, Garden City, N. Y., assignor to Sperry Products, Inc., Hoboken, N. J., a corporation of New York Application November 4, 1939, Serial No. 302,836

4 Claims. (Cl. 219—4)

This invention relates to the art of rail welding and is specifically concerned with the problem which arises by reason of the fact that rails as they come from the mill have certain variations in cross-section so that after welding there is necessitated a large amount of grinding to cause coincidence of the rail contours at the weld. Those who have worked with rails, particularly in welding the same to form long rail lengths, are familiar with the fact that rails vary in height, frequently by as much as $\frac{1}{32}''$; that they vary in width by as much as several thirty-seconds of an inch; that frequently the rail section is not symmetrical, and the web may not be central by as much as $\frac{1}{32}''$ at 4'' above the base; and, finally, that the rail may be bent either up or down by as much as .015'' in 9 inches.

It is, of course, necessary to provide a smooth running surface on the rail to prevent batter from the car wheels, and, furthermore, it is desirable to have the base and web of the rails in alignment. If all of these conditions were to be met and the above described tolerances obtained, it would be necessary to grind an excessive amount of material not only from the running surface of the rail but from other parts of the rail section as well. In order to reduce this grinding operation to a minimum it is considered desirable to weld the heads in line, letting the other parts of the rail join as they will. This invention has for one of its principal objects, therefore, to provide means in a rail welding machine whereby the rail ends may be moved relative to one another to bring the running surfaces in line.

It is now well known that when rails are welded they must be brought together with an upward camber so that the angle between their running surfaces is greater than 180°. This is due to the fact that upon cooling, the rails tend to bend downwardly at the joint and unless this upward camber were provided there would result a depression or cavity in the rail at the weld. It is a further object of my invention to provide means whereby such camber may be obtained.

The problem hereinbefore described is thus complicated by the fact that such camber must be provided and therefore it is essential to provide means which will permit relative movement of the rail ends to be welded together while at the same time retaining the predetermined upward camber. It is a further object of my invention to provide means which will permit such relative movement of the rail ends while retaining a predetermined upward camber of the rails.

Further objects and advantages of this invention will become apparent in the following detailed description.

In the accompanying drawings,

Fig. 1 is a side elevation, largely diagrammatic and with parts omitted, of a rail welding machine having my invention applied thereto.

Fig. 2 is a section taken substantially on the line 2—2 of Fig. 1.

Fig. 3 is a section taken substantially on the line 3—3 of Fig. 1.

Figure 4:
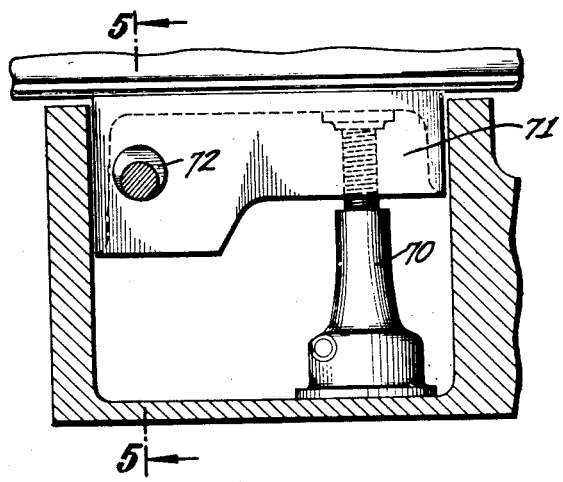
Fig. 4 is an enlarged view, partly sectioned vertically, of one form of rail end moving mechanism.

Referring first to Figs. 1 and 2 of the drawings, there is disclosed a type of rail welding machine known as the Sperry rail welder. This machine operates on the flash butt welding system wherein rails are moved together until flashing occurs, and the flashing is continued until the rail ends are heated sufficiently, whereupon the rails are moved together with great force in a butting operation to form the weld. For this purpose the machine comprises a heavy main frame 10 in which one rail 11 is supported in fixed relation to said frame. For this purpose the rail is supported upon a base 12 and is held locked to said base by a vertical fluid-pressed plunger 15 engaging the upper tread, and by a horizontal fluid-pressed plunger 16 (see Fig. 2) engaging the web to press the same against a fixed stop 17. Fluid pressure for operating said plungers may be provided from any suitable source and caused to enter fluid-pressure cylinders 19, 20 in which operate pistons 21, 22 which carry the said plungers. The other rail is supported in a moving carriage 30 operating on a platen 31 fixed to the bed of the main frame 10, the said carriage being movable on said platen. The end of the rail carried by said carriage is supported in a manner similar to the end of the other rail, that is, by a vertical plunger 15' and by a side plunger (not shown), the said plungers being operated by fluid-pressure from said fluid-pressure source and extending into cylinders to operate pistons which carry the said plungers. Said latter cylinders are mounted upon and movable with the carriage 30. The carriage may be moved by means of a large plunger 31 connected to said carriage and operating in a fluid-pressure cylinder 32 supplied with pressure from a suitable source. The movable rail may thus be fed toward the fixed rail to cause flashing and to maintain flashing, and finally the pressure in cylinder 32 may be caused to effect the final push-up or butting operation to form the weld. Current may be sent into the rail ends by means of current contact arms 40, 40' pivoted on the main frame and on the carriage at 41, 41' (see Fig. 3), respectively and supplied with current from transformer elements 42, 42' also mounted on the fixed frame and on the carriage respectively, the said transformer elements being energized from a suitable source of electric energy.

As stated in the introduction, two problems in relative positioning of the rail ends present themselves. The first is the problem of providing the necessary camber between the rail ends so that there will be more than 180° between the running surfaces of the rail ends and so that, upon cooling, the rail ends will straighten out and be in alignment. The second problem arises out of the variations in dimension of rails coming from the same mill and caused by the variations in mill tolerances which are allowed and which are frequently exceeded. The latter problem consists in welding the rails so that the running surface and gage side of the railheads are in alignment, allowing the rest of the rail contour to assume whatever relative positions they may. This will reduce the amount of grinding on the two essential surfaces, namely, the tread and the gage sides of the rails. I provide a single means whereby both of the above problems may be solved and the rails may be moved relative to one another in the welding machine to provide the necessary camber and also to bring the rail running surfaces and gage surfaces into coincidence without destroying the predetermined camber.

The mechanism for accomplishing the results described in the preceding paragraph are shown in the drawings, wherein it will be seen that the fixed rail rests upon a support 12 which is capable of being moved relative to the main frame. The said support may take the form of a base having lateral and end skirt portions depending therefrom. In engagement with the under surface of the said support there are provided a plurality of movable jacks 50, 51 spaced lengthwise of the rail and capable of being moved independently and together. For this purpose the jacks are shown in the form of screw jacks which may be operated by rotating shafts 52, 53 extending through the main frame, the said shafts being geared to central screws 54, 55 which carry the supporting plug at their upper ends in engagement with the said rail supporting channel member. The two shafts for the respective jacks may be operated in unison by means of a chain 57 extending over sprockets 58, 59 on each shaft and a central sprocket 60 which may be actuated by a handle 61. Thus, when the handle is rotated to rotate the central sprocket, both jacks are operated in unison to cause them to rise or descend in unison to give a parallel movement to the rail support and hence to the rail end. The rail being flexible, this parallel movement of the jacks ensures parallel movement of the rail end. A dog clutch 65 fitted to each of the sprockets on the jack shafts will release the chain drive and permit each jack to be operated separately to give the rail end the predetermined camber. Thus the jack nearer the rail end will be raised more or less than the jack further from the end and thus the rail will be given the necessary tilt or camber with respect to the other rail.

In operation, one dog clutch is first released and one jack is operated separately to give the rail end the necessary camber. Then the dog clutch is replaced and both jacks are operated to move the rail end up or down in parallel motion while retaining the predetermined camber until the running surfaces of the two rails are in the proper relationship.

Figure 7:
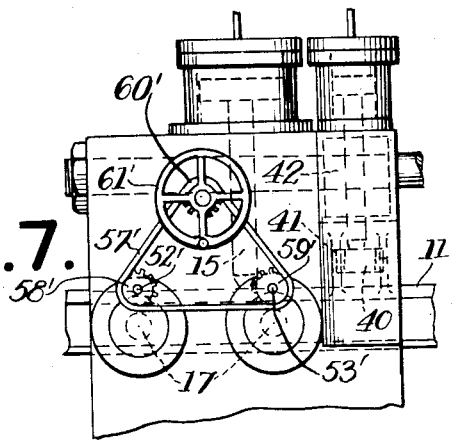
Fig. 7 is a side elevation of a modified form of means for moving a rail end laterally with a parallel motion.

In order to bring the gage sides of the two rails into agreement, the stop element 17 which cooperates with the rail on the channel support may be moved toward and away from the rail by means similar to the jacks and pulley drive just described. Thus, the fixed stop may be moved toward or away from the rail by means of a pair of jacks which will give parallel motion to the rail, as shown in Fig. 7. Similar numerals primed indicate parts similar to those shown in Figs. 1 and 2.

Instead of using two jacks, a single jack 70 may be employed operating a lever 71, as shown in Fig. 4, the said lever being pivoted on an eccentric pivot 72. A handle 73 connected to the eccentric pivot will cause the left-hand end of the lever to rise or fall while the jack performs the same function at the right-hand end of the lever.

Figure 5:
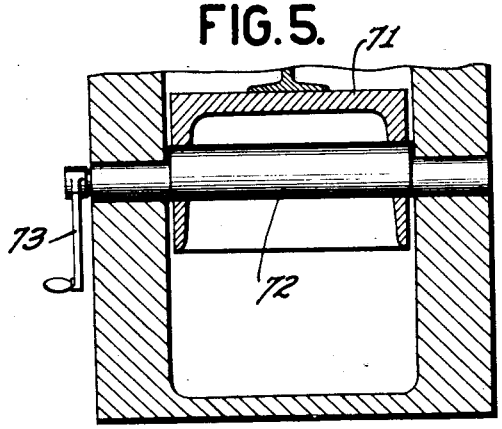
Fig. 5 is a section taken substantially on the line 5—5 of Fig. 4.
Figure 6:
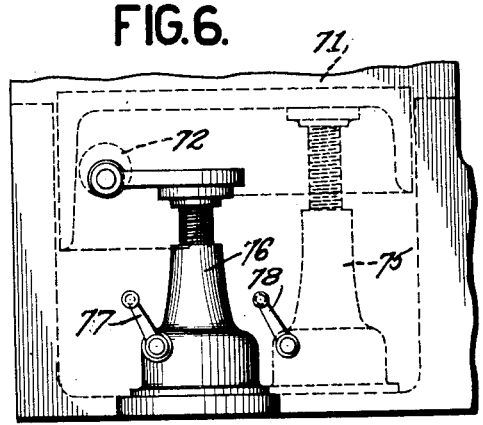
Fig. 6 is a view similar to Fig. 4 showing a modified form of rail moving device.

In still another modification (shown in Fig. 6) two jacks 75, 76 may be employed, one of the type shown in Figs. 1 to 3 and the other of the type shown in Figs. 4 and 5, operated by handles 77 and 78.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail welding machine, means for supporting the adjacent ends of the rails to be welded, and means for moving one rail end relative to the other rail end, said means including means whereby inclination may be imparted to one of said rail ends relative to the other rail end to provide a predetermined camber and whereby said first rail end may be moved vertically relative to said other rail end without changing said camber.

2. In a rail welding machine, means for supporting the adjacent ends of the rails to be welded, and means for moving one rail end relative to the other rail end, said means including means whereby inclination may be imparted to one of said rail ends relative to the other rail end to provide a predetermined camber and whereby said first rail end may be moved vertically by motion substantially parallel to the longitudinal axis of said rail end relative to said other rail end whereby said camber will not be changed.

3. In a rail welding machine, means for supporting the adjacent ends of the rails to be welded, means whereby one of said rail ends may be moved vertically relative to said other rail end, said means including a plurality of elevating members positioned axially along the first rail end and means whereby said elevating members may be operated simultaneously.

4. In a rail welding machine, means for supporting the adjacent ends of the rails to be welded and means for moving one rail end relative to the other rail end, said means including a plurality of elevating members positioned axially along one rail end and means whereby said members may be operated independently or simultaneously, whereby a predetermined camber may be imparted to said first rail end relative to the other rail end by independent operation of said members, and parallel motion vertically may be imparted to said first rail end relative to said other rail end by simultaneous operation of said members.

GEORGE LESTER JONES.